United States Patent
Yasui (10) Patent No.: US 9,380,187 B2
(45) Date of Patent: Jun. 28, 2016

(54) FACSIMILE APPARATUS AND FACSIMILE COMMUNICATION SYSTEM

(71) Applicant: KYOCERA Document Solutions Inc., Osaka (JP)

(72) Inventor: Yoshiaki Yasui, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/720,090

(22) Filed: May 22, 2015

(65) Prior Publication Data

US 2015/0341525 A1 Nov. 26, 2015

(30) Foreign Application Priority Data

May 22, 2014 (JP) ................. 2014-106287

(51) Int. Cl.
| | | |
|---|---|---|
| H04N 1/32 | (2006.01) | |
| G06F 3/12 | (2006.01) | |
| H04N 1/00 | (2006.01) | |

(52) U.S. Cl.
CPC .......... *H04N 1/32459* (2013.01); *G06F 3/1256* (2013.01); *G06F 3/1257* (2013.01); *H04N 1/00* (2013.01); *H04N 1/0044* (2013.01); *H04N 1/00477* (2013.01); *H04N 1/00482* (2013.01); *H04N 1/32* (2013.01); *H04N 1/32048* (2013.01); *H04N 1/32368* (2013.01); *H04N 2201/0094* (2013.01)

(58) Field of Classification Search
CPC ............ H04N 1/32459; H04N 1/0044; H04N 1/00477; H04N 1/00482; H04N 1/32048; H04N 1/32368; H04N 2201/0094; G06F 3/1256; G06F 3/1257
USPC ................. 358/3.24, 474, 475, 468
See application file for complete search history.

(56) References Cited

U.S. PATENT DOCUMENTS

| | | | | |
|---|---|---|---|---|
| 7,570,375 B2* | 8/2009 | Morisaki | ................ | G06K 15/00 358/1.13 |
| 2009/0303548 A1* | 12/2009 | Harrington | ........ | H04N 1/00411 358/407 |

FOREIGN PATENT DOCUMENTS

| | | |
|---|---|---|
| JP | 2004-102614 | 4/2004 |
| JP | 2008-219811 | 9/2008 |
| JP | 2012-235206 | 11/2012 |

\* cited by examiner

*Primary Examiner* — Quang N Vo (57) ABSTRACT

A facsimile apparatus includes a data acquisition section, a facsimile transmission candidate image storage section, a destination receiving section, a facsimile communication section, a print setting information management section, and a facsimile transmission image generating section. The facsimile communication section is configured to transmit and receive, to and from a destination facsimile apparatus, information necessary for facsimile communication including a facsimile transmission candidate image and print setting information. The print setting information management section is configured to store the print setting information received from the destination by the facsimile communication section. The facsimile transmission image generating section is configured to manipulate the facsimile transmission candidate image to meet the printing condition indicated by the print setting information on the destination stored in the print setting information management section, thus generating a facsimile transmission image subject to a facsimile transmission to the destination.

6 Claims, 10 Drawing Sheets

Fig.2

Fig.5B PRINTING ON 11 inch x 17 inch-SIZED PAPER

Fig.5A PRINTING ON A3-SIZED PAPER

Fig.9

EXTRACT FROM ITU-T RECOMMENDATION T.30, TABLE 2/T.30

| BIT NO. | FIF OF DCS SIGNAL |
|---|---|
| 44 | RESOLUTION TYPE SELECTION |
| (0) | METRIC-BASED RESOLUTION |
| (1) | INCH-BASED RESOLUTION |
| 45 | DON'T CARE |
| 46 | DON'T CARE |
| 47 | SET TO 0 |
| 48 | EXTEND FIELD |

FACSIMILE APPARATUS AND FACSIMILE COMMUNICATION SYSTEM

INCORPORATION BY REFERENCE

This application claims priority to Japanese Patent Application No. 2014-106287 filed on May 22, 2014, the entire contents of which are incorporated by reference herein.

BACKGROUND

The present disclosure relates to facsimile apparatuses and facsimile communication systems and particularly relates to a technique for manipulating an image subject to a facsimile transmission to meet a printing condition of a destination facsimile apparatus.

A technique is proposed for allowing a facsimile apparatus to manipulate an image subject to a facsimile transmission to meet a printing condition of another facsimile apparatus as a destination (on a receiving side). For example, a facsimile apparatus is known which can acquire information on recording paper sheets from a receiving (destination) facsimile apparatus. A technique is also known for allowing a printer to generate and display a preview image according to print setting before actual printing. Furthermore, a technique is also known in which a transmitting facsimile apparatus acquires print setting information on a receiving facsimile apparatus, specifies a printing manner of the receiving facsimile apparatus, notifies the receiving facsimile apparatus of the specified printing manner, and thus allows the receiving facsimile apparatus to perform printing as previewed.

SUMMARY

A technique improved over the above techniques is proposed as one aspect of the present disclosure.

A facsimile apparatus according to an aspect of the present disclosure includes a data acquisition section, a facsimile transmission candidate image storage section, a destination receiving section, a facsimile communication section, a print setting information management section, and a facsimile transmission image generating section.

The data acquisition section is configured to acquire data serving as a candidate for facsimile communication.

The facsimile transmission candidate image storage section is configured to store as a facsimile transmission candidate image the data acquired by the data acquisition section.

The destination receiving section is configured to receive from an operator a destination entry indicating a destination for transmitting the facsimile transmission candidate image.

The facsimile communication section is configured to transmit and receive, to and from a destination facsimile apparatus received as the destination, information necessary for facsimile communication including the facsimile transmission candidate image and print setting information indicating a printing condition of the destination facsimile apparatus.

The print setting information management section is configured to store the print setting information received from the destination by the facsimile communication section.

The facsimile transmission image generating section is configured to manipulate the facsimile transmission candidate image to meet the printing condition indicated by the print setting information on the destination stored in the print setting information management section, thus generating a facsimile transmission image subject to a facsimile transmission to the destination.

A facsimile system according to another aspect of the present disclosure is a facsimile communication system including a transmitting facsimile apparatus and a receiving facsimile apparatus both configured to perform facsimile communication.

The transmitting facsimile apparatus includes the aforementioned data acquisition section, the aforementioned facsimile transmission candidate image storage section, the aforementioned destination receiving section, the aforementioned facsimile communication section, the aforementioned print setting information management section, and the aforementioned facsimile transmission image generating section.

The receiving facsimile apparatus includes a facsimile communication section and a print setting information management section.

The print setting information management section is configured to store print setting information indicating a printing condition.

The facsimile communication section is configured to transmit and receive from and to the transmitting facsimile apparatus information necessary for a facsimile transmission. The facsimile communication section of the receiving facsimile apparatus is further configured to, when receiving a request to transmit the print setting information from the transmitting facsimile apparatus, transmit the print setting information stored in the print setting information management section to the transmitting facsimile apparatus.

A facsimile apparatus according to still another aspect of the present disclosure includes a facsimile communication section and a print setting information management section.

The print setting information management section is configured to store print setting information indicating a printing condition.

The facsimile communication section is configured to transmit and receive from and to an external facsimile apparatus information necessary for a facsimile transmission. The facsimile communication section is further configured to, when receiving a request to transmit the print setting information from the external facsimile apparatus, transmit the print setting information stored in the print setting information management section to the external facsimile apparatus.

DETAILED DESCRIPTION

Figure 1:
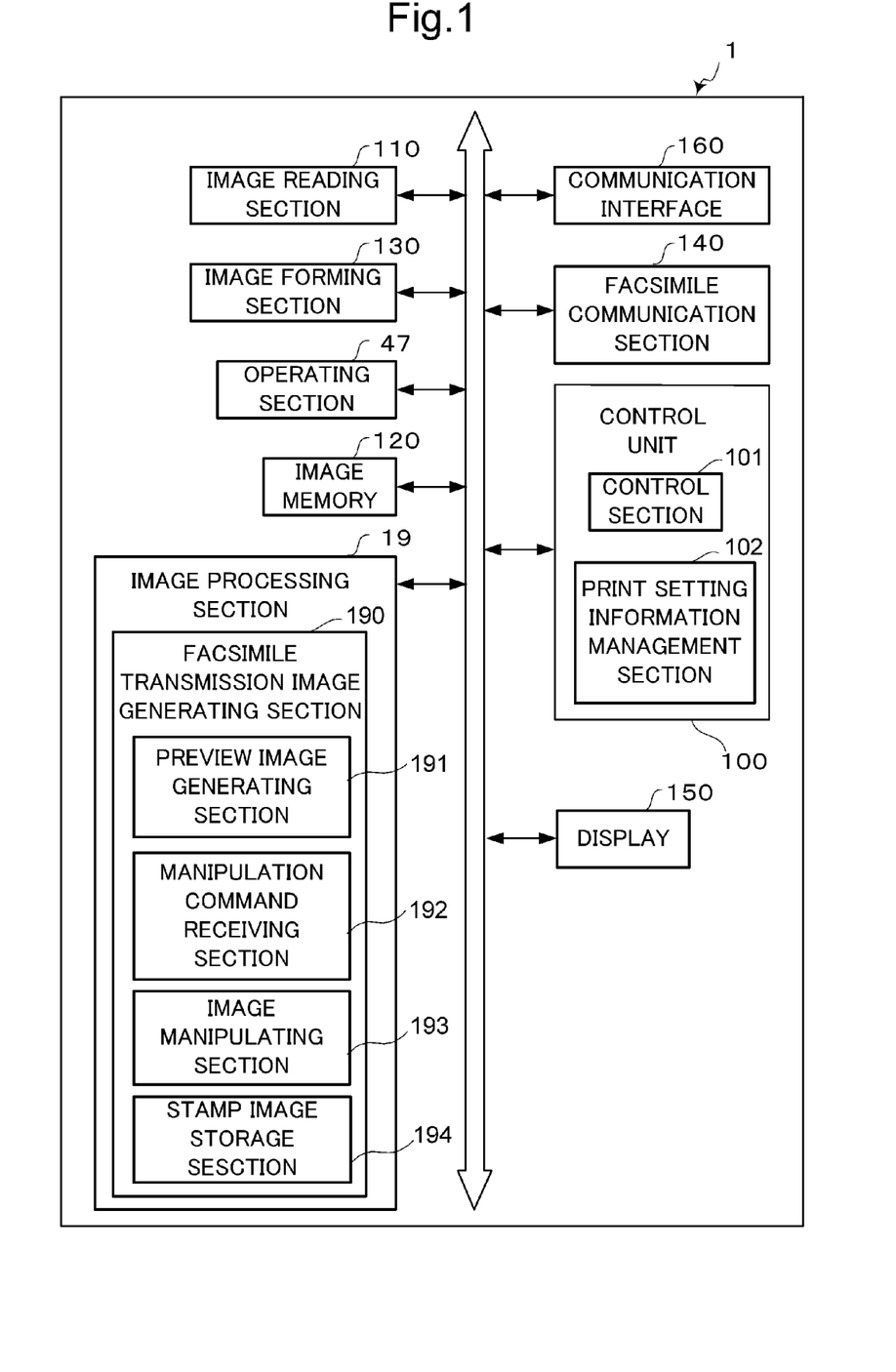
FIG. 1 is a block diagram showing a schematic internal configuration of a multifunction peripheral as a facsimile apparatus according to an embodiment of the present disclosure.

Hereinafter, a description will be given of a facsimile apparatus and a facsimile communication system, both according to an embodiment of the present disclosure, with reference to the drawings. FIG. 1 is a block diagram showing a schematic internal configuration of a multifunction peripheral as the facsimile apparatus according to the embodiment of the present disclosure.

The multifunction peripheral 1 according to the embodiment of the present disclosure includes a control unit 100, an image reading section 110, an image memory 120, an image forming section 130, an operating section 47, and a facsimile communication section 140.

The image reading section 110 (an example of the data acquisition section) includes a scanner or the like configured to read an original document to acquire an image of the original document. The image reading section 110 is composed of, for example, an ADF (auto document feeder) including: a scanner configured to scan an image of an original document placed or being conveyed on a platen; and an ejection mechanism configured to eject the scanned original document. The image reading section 110 is configured to read a set of original documents subject to a facsimile transmission sheet by sheet and thus acquire, as data subject to the facsimile transmission, a set of pages of image data of the original documents (a set of images of the original documents), together with information about each page, on a page-by-page basis.

The image memory 120 (an example of the facsimile transmission candidate image storage section) is configured to temporarily store data subject to printing in the image forming section 130, such as a set of pages of image data of original documents read by the image reading section 110 or a set of pages of image data acquired by the facsimile communication section 140 or a communication interface 160 and being subject to a facsimile transmission.

The image forming section 130 is configured to retrieve the data stored in the image memory 120, such a set of pages of image data of original documents read by the image reading section 110 or a set of pages of image data received from any external facsimile apparatus, and form (print) an image using the retrieved data.

The operating section 47 (an example of the destination receiving section) is configured to receive entries of various operation commands from an operator. Specifically, the operating section 47 is configured as the destination receiving section to receive from the operator an entry of information indicating a destination for transmitting one or more pieces of data (facsimile transmission images) subject to the facsimile transmission.

The facsimile communication section 140 is configured to perform various functions necessary for facsimile communication and transmit and receive image data to and from external facsimile apparatuses over public lines. For example, the control section 101 retrieves, in page order, the set of pages of image data of original documents for facsimile transmission read by the image reading section 110 and temporarily stored in the image memory 120 and allows the facsimile communication section 140 to fax the retrieved set of pages of image data to a destination facsimile apparatus designated by a user's operation of the operating section 47.

The facsimile communication section 140 is further configured to transmit and receive, to and from a receiving facsimile apparatus received as the destination by the operating section 47, information necessary for facsimile communication including print setting information indicating one or more printing conditions of the receiving facsimile apparatus.

The multifunction peripheral 1 further includes an image processing section 19 configured to edit and manipulate the images read by the image reading section 110.

The image processing section 19 is configured to manipulate one or more pages of image data as facsimile transmission candidate images stored in the image memory 120, according to the printing conditions indicated by the print setting information of the receiving facsimile apparatus as the destination, the print setting information being stored in a print setting information management section 102 to be described later, thus generating one or more facsimile transmission images subject to the facsimile transmission to the destination and their respective preview images.

The image processing section 19 serves as a facsimile transmission image generating section 190 and includes a preview image generating section 191, a manipulation command receiving section 192, an image manipulating section 193, and a stamp image storage section 194.

The preview image generating section 191 is configured to generate preview images based on the associated pages of image data stored in the image memory 120, using the printing conditions indicated by the print setting information stored, together with an association with the destination received by the operating section 47, in the print setting information management section 102.

The manipulation command receiving section 192 is configured to, while a display 150 displays the preview image or images, receive through the operating section 47 an operator's entry of a manipulation command to manipulate the one or more associated pages of image data as facsimile transmission candidate images stored in the image memory 120.

The image manipulating section 193 is configured to manipulate the one or more pages of image data as facsimile transmission candidate images stored in the image memory 120, according the contents of the manipulation command received by the manipulation command receiving section 192, thus generating the one or more facsimile transmission images meeting the printing conditions stored in the print setting information management section 102.

Furthermore, the image manipulating section 193 can insert a TTI (transmit terminal identification) into the facsimile transmission image. Particularly, for each image manipulated based on the command received by the manipulation command receiving section 192, the image manipulating section 193 reads from the stamp image storage section 194 a stamp image indicating that the image has been manipulated and superimposes the stamp image on the manipulated image.

The multifunction peripheral 1 further includes the communication interface 160 for use to communicate various data with external personal computers and servers connected thereto via a network.

The control unit 100 is formed of a CPU, a ROM, a RAM, and so on and governs the overall operation of the multifunction peripheral 1. The control unit 100 includes the control section 101 and the print setting information management section 102. An HDD or an unshown ROM stores a facsimile communication program for the multifunction peripheral 1. The control unit 100 performs, as the control section 101 and the print setting information management section 102, operations necessary for performing facsimile communication described below in this embodiment by operating according to the facsimile communication program.

The control section 101 governs the overall operation of the multifunction peripheral 1. Furthermore, the control section 101 performs below-described processing relating to facsimile communication.

The print setting information management section 102 is configured to, when the multifunction peripheral 1 serves as a transmitting facsimile apparatus which is on a transmitting side for transmitting a facsimile transmission image, store the print setting information on the destination acquired by the facsimile communication section 140 from the receiving facsimile apparatus received as the destination by the operating section 47.

The print setting information management section 102 is further configured to determine whether or not a below-described signal transmitted from the destination contains print setting information and, if the signal contains the print setting information, store the print setting information in its internal memory or the like.

The print setting information management section 102 also stores print setting information indicating printing conditions configured for the multifunction peripheral 1.

Figure 2:
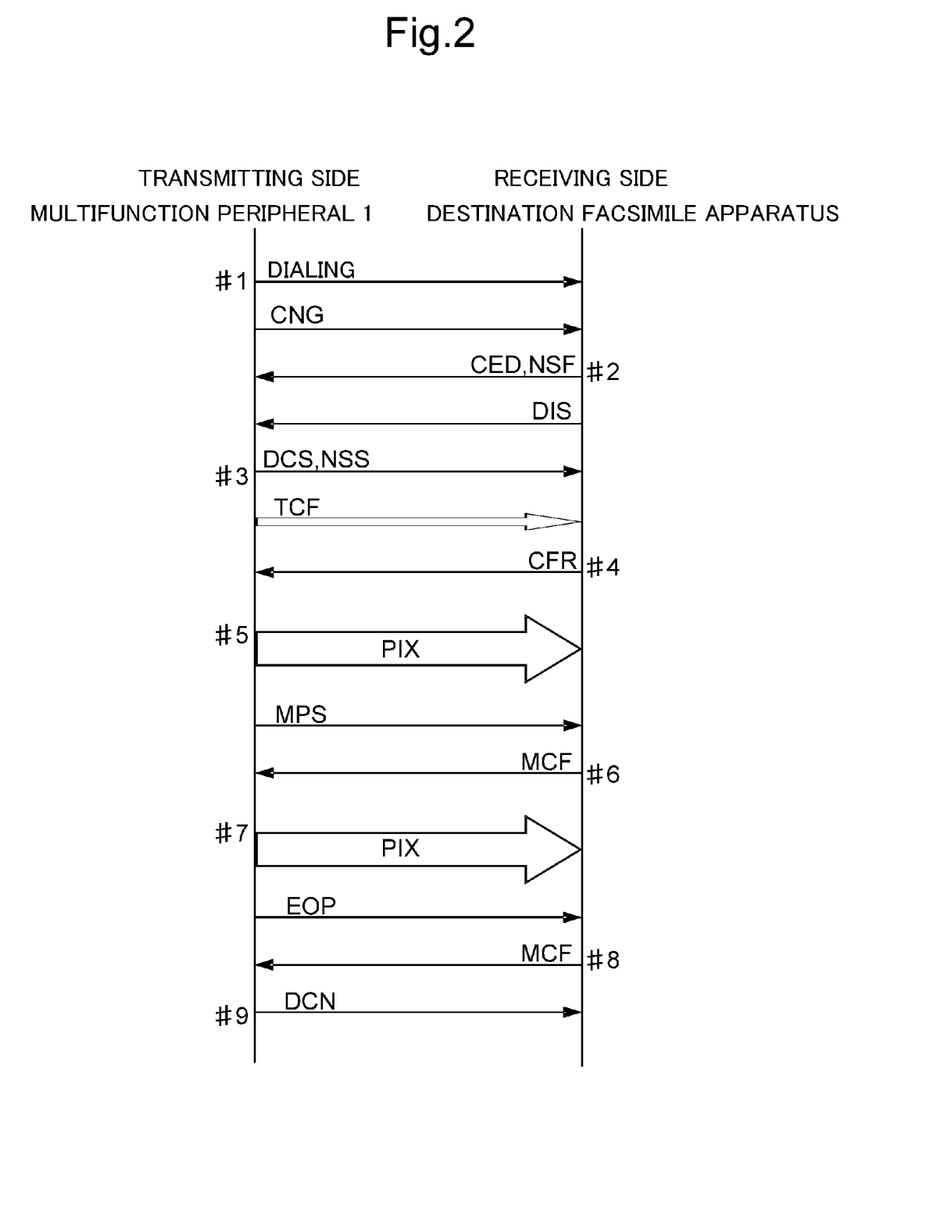
FIG. 2 is a chart showing facsimile communication processing between the multifunction peripheral and a facsimile apparatus serving as a destination for facsimile transmission.

Next, a description will be given of facsimile communication processing between the multifunction peripheral 1 and a facsimile apparatus serving as a destination for facsimile transmission. FIG. 2 is a chart showing the facsimile communication processing between the multifunction peripheral 1 and the facsimile apparatus serving as a destination for facsimile transmission.

In the multifunction peripheral 1 as a transmitting side, its facsimile communication section 140 (hereinafter, referred to as the multifunction peripheral 1 so far as the description of the facsimile communication processing is concerned) issues a call to a destination facsimile apparatus by dialing based on a facsimile transmission command entered by a user's operation of the operating section 47 (i.e., a facsimile transmission job) and transmits a CNG signal to notify the destination facsimile apparatus that the multifunction peripheral 1 is a facsimile apparatus trying to initiate facsimile communication (#1).

When in the destination facsimile apparatus its facsimile communication section (hereinafter, referred to as the destination facsimile apparatus so far as the description of the facsimile communication processing is concerned) receives, as a receiving side, the CNG signal, the destination facsimile apparatus transmits back to the multifunction peripheral 1 a CED signal as a response signal to the CNG signal, an NSF signal as a signal for identifying a non-standard function representing an optional function owned by the receiving side, and a DIS signal informing the transmitting side of functions (such as CCITT specification) owned by the receiving side (#2). For example, the NSF signal is a message signal based on T.30 protocol for use in the facsimile apparatus to notify of a specific facility of a unique format different from a standard format.

When receiving the CED signal, the NSF signal, and the DIS signal from the destination facsimile apparatus, the multifunction peripheral 1 (a caller) transmits to the destination facsimile apparatus a DCS signal informing the destination of set-up data (such as CCITT specification) of the multifunction peripheral 1, an NSS signal responding to the NSF signal and serving as a signal for identifying a non-standard function, and a TCF signal for modem training (#3). Specifically, the caller's facsimile apparatus has already been notified of a specific facility by the NSF signal from the destination facsimile apparatus. Therefore, if the caller's facsimile apparatus has a function compatible with the specific facility, it notifies, using the NSS signal, the destination facsimile apparatus of a message indicating compatibility with the specific facility. In this embodiment, the NSF signal and the NSS signal are transmitted and received with the addition of information necessary for processing (to be described hereinafter) for transmitting a facsimile transmission image meeting the printing conditions of the receiving facsimile apparatus.

When receiving the DCS signal, the NSS signal, and the TCF signal, the destination facsimile apparatus transmits back to the multifunction peripheral 1 a CFR signal indicating successful receipt of the above signals (#4).

When the multifunction peripheral 1 as the transmitting side receives the CFR signal, it transmits to the destination facsimile apparatus a first page of image data (PIX) subject to a facsimile transmission in this facsimile transmission job (#5). In addition, if there is any other page of image data subject to the facsimile transmission, the multifunction peripheral 1 transmits to the destination facsimile apparatus an MPS signal indicating that there is another or other pages of image data to be subsequently faxed.

The destination facsimile apparatus as the receiving side allows its image memory to temporarily store the received first page of image data (PIX). Then, the destination facsimile apparatus transmits back to the multifunction peripheral 1 an MCF signal indicating that the first page of image data has been successfully received (#6).

When the multifunction peripheral 1 receives the MCF signal from the destination facsimile apparatus, it transmits to the destination facsimile apparatus a next page of image data (PIX) and, so long as there is still another page of image data subject to the facsimile transmission, an MPS signal. In this case, the destination facsimile apparatus repeats the processing step #6 of allowing the image memory to temporarily store the received page of image data (PIX) and transmitting an MCF signal back to the multifunction peripheral 1. Thereafter, the processing steps #5 and #6 are repeated until the multifunction peripheral 1 completes the transmission of all of a set of pages of image data subject to the facsimile transmission.

Then, when the multifunction peripheral 1 transmits to the destination facsimile apparatus a last page of image data (PIX) subject to the facsimile transmission, it transmits to the destination facsimile apparatus an EOP signal indicating the end of data transmission (#7). The destination facsimile apparatus transmits back to the multifunction peripheral 1 an MCF signal indicating that the last page of image data has been received (#8).

When the multifunction peripheral 1 receives the above MCF signal from the destination facsimile apparatus after transmitting the EOP signal, it transmits to the destination facsimile apparatus a DCN signal and disconnects the line (#9).

Figure 3:
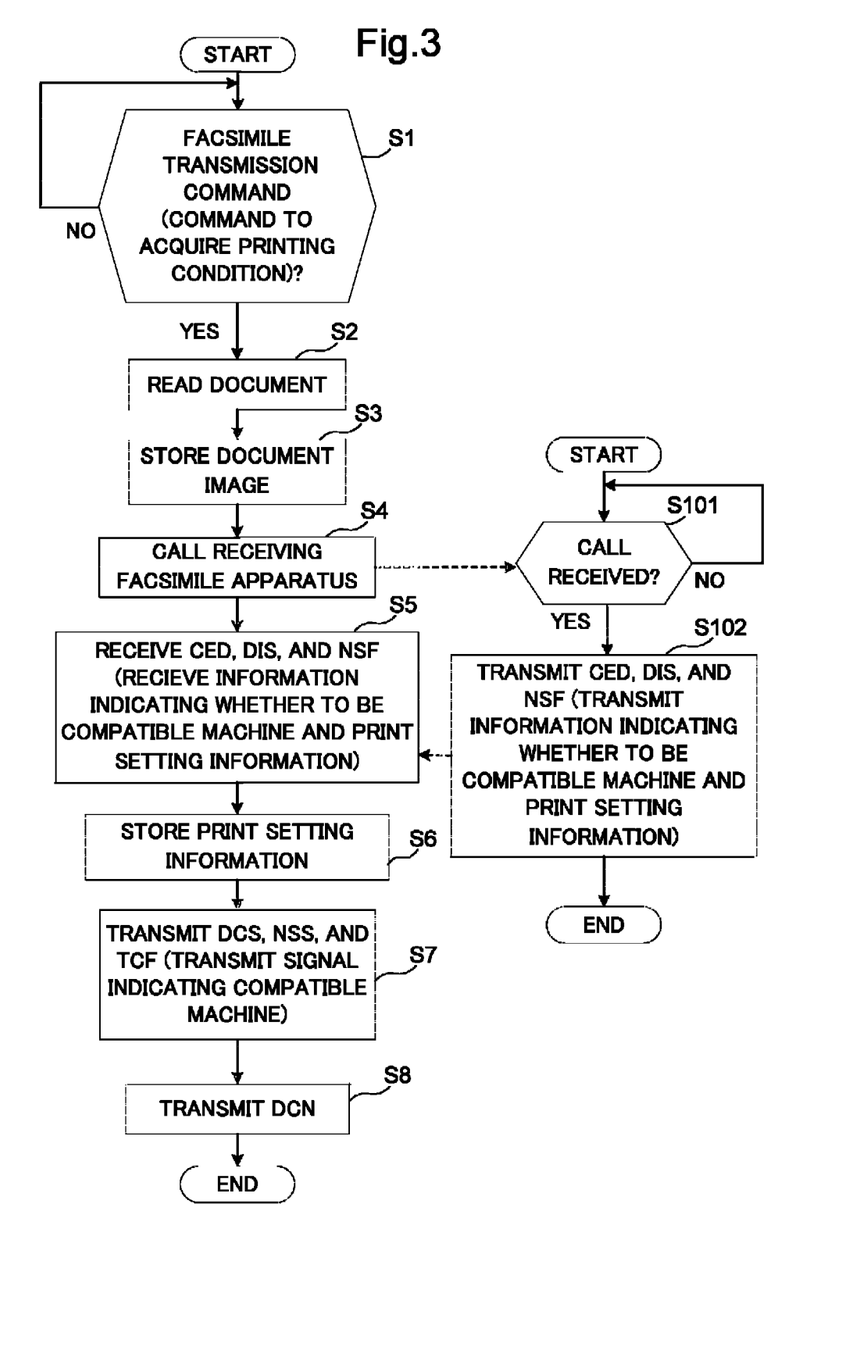
FIG. 3 is a flowchart showing facsimile communication processing when the multifunction peripheral acquires print setting information from a destination.

Next, a description will be given of facsimile communication processing when the multifunction peripheral 1 serving as a transmitting facsimile apparatus acquires print setting information from a destination. FIG. 3 is a flowchart showing the facsimile communication processing when the multifunction peripheral 1 acquires print setting information from a destination.

For example, when an operator operates the operating section 47 to designate a receiving facsimile apparatus as a destination and enter a command to perform a facsimile transmission after the acquisition of print setting information from the destination (YES in S1), the control section 101 allows the image reading section 110 to read an original document placed on the platen of the automatic scanning mechanism (not shown) provided in the image reading section 110 (S2).

In doing so, the control section 101 allows the image memory 120 to store, as a candidate image for the facsimile transmission (hereinafter, referred to as a facsimile transmission candidate image), the document image acquired by the reading operation of the image reading section 110 (S3).

Subsequently, under the control of the control section 101, the facsimile communication section 140 issues a call to the receiving facsimile apparatus serving as the destination and transmits a CNG signal to it (S4).

When the receiving facsimile apparatus receives the call from the multifunction peripheral 1 serving as the transmitting side (YES in S101), it responds to the call to transmit a CED signal, a DIS signal, and an NSF signal back to the multifunction peripheral 1 (S102).

In doing so, the receiving facsimile apparatus retrieves print setting information indicating its own printing conditions from its own print setting information storage section, incorporates, into the NSF signal, the retrieved print setting information and information indicating that the receiving facsimile apparatus is a compatible machine with the multifunction peripheral 1, and then transmits the NSF signal to the multifunction peripheral 1. The printing conditions include: for example, (1) recording paper sheet sizes that can be used for printing on the receiving facsimile apparatus; (2) the respective printable areas of the recording paper sheet sizes (which may also be referred to as margin setting); and (3) a setting of whether or not a received facsimile image is forwarded to any personal computer or any other facsimile apparatus. However, these conditions are merely illustrative and are not intended to limit the scope of the printing conditions.

The facsimile communication section 140 of the multifunction peripheral 1 as the transmitting side receives the CED signal, the DIS signal, and the NSF signal (S5).

Upon receipt of these signals, the print setting information management section 102 of the multifunction peripheral 1 determines whether or not the NSF signal contains print setting information from the receiving facsimile apparatus. If the NSF signal contains the print setting information, the print setting information management section 102 stores the print setting information as print setting information about the receiving facsimile apparatus received as the destination in S1 (S6).

The control section 101 of the multifunction peripheral 1 allows the facsimile communication section 140 to transmit a DCS signal, an NSS signal responding to the NSF signal, and a TCF signal to the receiving facsimile apparatus (S7). In doing so, the facsimile communication section 140 transmits, to the receiving facsimile apparatus, the NSS signal with the incorporation of information indicating that the facsimile communication section 140 is compatible with the receiving facsimile apparatus. Thereafter, the facsimile communication section 140 transmits a DCN signal to the receiving facsimile apparatus (S8) to end the communication.

Through the above facsimile communication processing, the print setting information about the receiving facsimile apparatus is stored on the multifunction peripheral 1 as the transmitting side.

Figure 4:
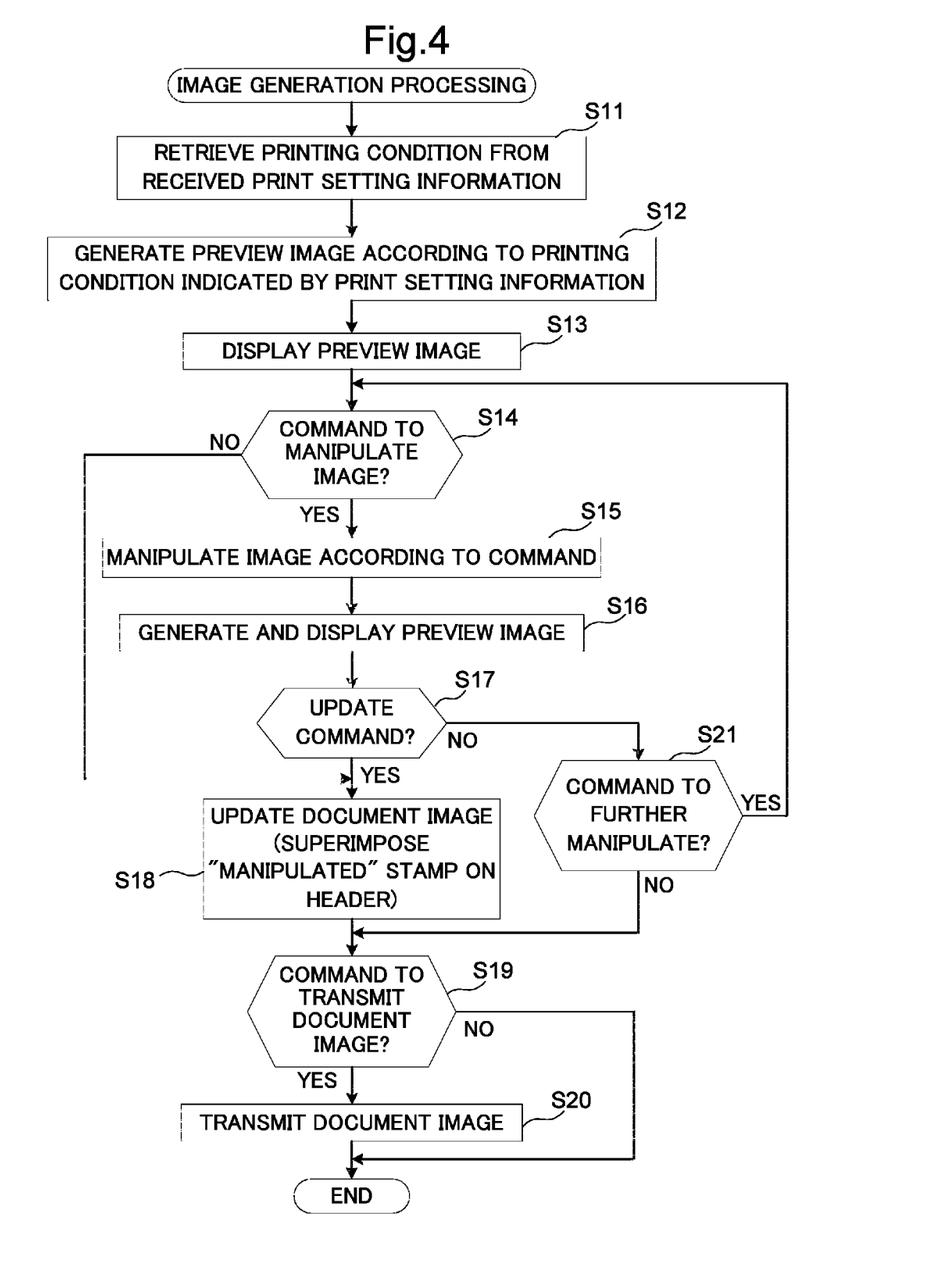
FIG. 4 is a flowchart showing a first embodiment of facsimile transmission processing which the multifunction peripheral performs as a transmitting facsimile apparatus based on the acquired print setting information.

Next, a description will be given of a first embodiment of facsimile transmission processing which the multifunction peripheral 1 performs as a transmitting facsimile apparatus based on the acquired print setting information. FIG. 4 is a flowchart showing the first embodiment of facsimile transmission processing which the multifunction peripheral performs as a transmitting facsimile apparatus based on the acquired print setting information.

After the facsimile communication processing shown in FIG. 3, the preview image generating section 191 in the multifunction peripheral 1 analyzes the print setting information about the destination facsimile apparatus stored in the print setting information management section 102 to retrieve from the print setting information the printing conditions, i.e., (1) recording paper sheet sizes that can be used for printing, (2) the respective printable areas of the recording paper sheet sizes, (3) a setting of forwarding to an external apparatus, and so on (S11).

Then, the preview image generating section 191 manipulates, according to the analyzed printing conditions, a facsimile transmission candidate image stored together with an association with the destination in the image memory 120 to generate a preview image indicating an image which will be printed on the destination (S12).

Figure 5A:
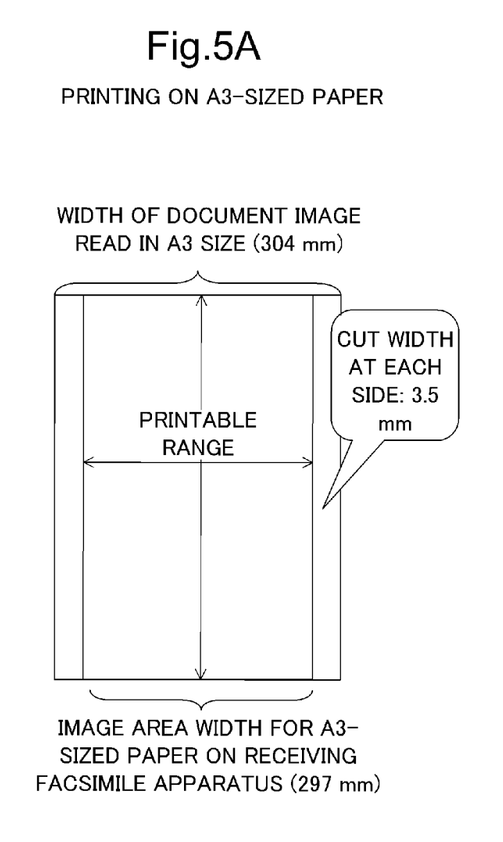
FIG. 5A is a view showing a difference between an image area of a document image of A3 size read by the multifunction peripheral and an image area to be printed on a receiving facsimile apparatus.

For example, suppose that, as shown in FIG. 5A, a document image read as an original document subject to the facsimile transmission in S2 of the processing shown in FIG. 3 is A3 sized (304 mm wide) and the printing conditions of the destination include printability on A3-sized recording paper sheets and a 297 mm wide printable area for A3-sized recording paper sheets. In this case, even if the above document image were transmitted as it is from the multifunction peripheral 1, the receiving facsimile apparatus would output a printed A3-sized recording paper sheet with the document image cut 3.5 mm at each lateral side. In view of this, the preview image generating section 191 generates as the preview image an image obtained by cutting the above 304 mm wide candidate image, which is stored in the image memory 120, 3.5 mm at each lateral side.

Figure 5B:
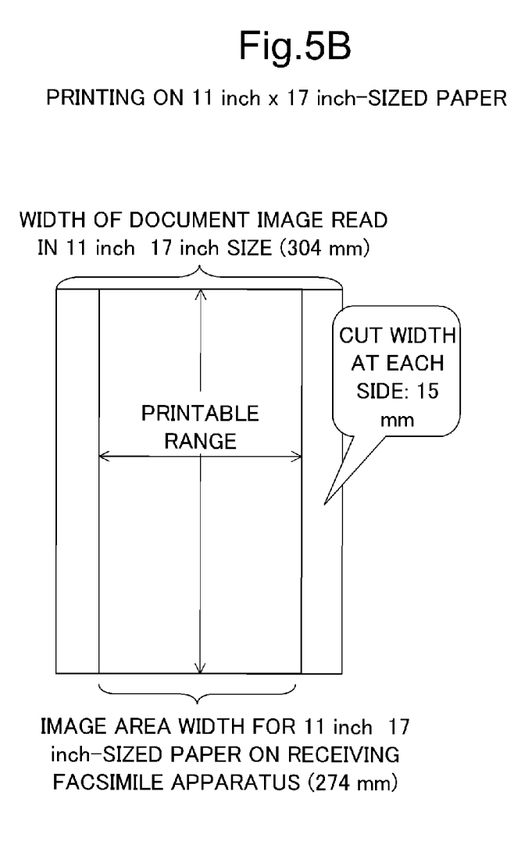
FIG. 5B is a view showing a difference between an image area of a document image of 11 inch×17 inch size read by the multifunction peripheral and an image area to be printed on a receiving facsimile apparatus.

For another example, suppose that, as shown in FIG. 5B, a document image subject to the facsimile transmission is A3 sized (304 mm wide) and the printing conditions of the destination include that printability on 11 inch×17 inch-sized recording paper sheets and a 274 mm wide printable area for 11 inch×17 inch-sized recording paper sheets. In this case, if the above document image were transmitted as it is from the multifunction peripheral 1, the receiving facsimile apparatus would output a printed recording paper sheet with the document image cut 15 mm at each lateral side. In view of this, the preview image generating section 191 generates as the preview image an image obtained by cutting the above 304 mm wide candidate image, which is stored in the image memory 120, 15 mm at each lateral side.

After the processing step of S12, the control section 101 allows the display 150 to display the generated preview image (S13). The operator can understand from this displayed preview image how the document image transmitted from the multifunction peripheral 1 will be printed on the receiving facsimile apparatus as the destination.

If, during the display of this preview image, a manipulation command to manipulate the facsimile transmission candidate image being stored in the image memory 120 at this point of time is entered by an operator's operation of the operating section 47 and the manipulation command receiving section 192 receives the manipulation command (YES in S14), the image manipulating section 193 manipulates the candidate image according to the contents indicated by the manipulation command (S15). The preview image generating section 191 generates a preview image from the manipulated facsimile transmission candidate image and the control section 101 allows the display 150 to display the preview image (S16). In other words, a preview of an image manipulated to be actually subject to transmission is displayed.

For example, when the operator views the displayed preview image and recognizes that the original A3-sized document image will be cut 3.5 mm at each lateral side on the receiving facsimile apparatus and therefore the original document image will not be printed as it is, the operator can operate the operating section 47 to enter a manipulation command to subject the facsimile transmission candidate image to reduction processing for reducing the size of the candidate image so that the candidate image can fall within a narrowed area 3.5 mm smaller at each lateral side than the A3 size. Thus, the operator can transmit as a facsimile transmission image the candidate image, which has been manipulated so that it will not be cut at each lateral side on printing, to the receiving facsimile apparatus as the destination.

A printer driver installed on the multifunction peripheral 1 may function as the image manipulating section 193 to perform the aforementioned image manipulation processing. Thus, for example, in the case of manipulating a character image instead of subjecting an image to simple reduction or enlargement processing, it is possible to reduce or enlarge the size of the image using fonts or the like in the printer driver. Therefore, a facsimile transmission image of high quality can be transmitted to the destination.

Thereafter, when the operator operates the operating section 47 to enter an update command to replace and update the facsimile transmission candidate image stored in the image memory 120 with the manipulated image (YES in S17), the control section 101 replaces and updates the facsimile transmission candidate image stored in the image memory 120 with the manipulated image (S18).

In doing so, the image manipulating section 193 may superimpose a stamp of "Manipulated" or "Reduced" on the header. When viewing this stamp, the receiver can recognize that the received image has been manipulated and resized.

When, after the update, the operator operates the operating section 47 to enter a facsimile transmission command to transmit the read document image to the destination designated in S1 of the aforementioned processing shown in FIG. 3 (YES in S19), the control section 101 allows the facsimile communication section 140 to retrieve the updated facsimile transmission image from the image memory 120 and transmit it to the destination (S20).

On the other hand, if in S14 the manipulation command receiving section 192 does not receive any manipulation command (NO in S14), the processing proceeds to S18.

Then, in the presence of a facsimile transmission command from the operator (YES in S19), the facsimile communication section 140 transmits an unmanipulated, original facsimile transmission candidate image to the destination facsimile apparatus.

If in S19 no facsimile transmission command is entered from the operator (NO in S19), the processing ends without performing any facsimile transmission to the destination.

Furthermore, if in S17 no update command is entered from the operator (NO in S17), the processing proceeds to S21. If in S21 the operator enters a remanipulation command to further manipulate the facsimile transmission candidate image (YES in S21), the processing goes back to S14, wherein manipulation processing based on the operator's manipulation command is performed again (S14 and subsequent steps). If no remanipulation command is entered from the operator (NO in S21), the processing proceeds to S19.

Thus, the operator of the multifunction peripheral 1 can generate, in the multifunction peripheral 1 as a transmitting facsimile apparatus, a facsimile image meeting the printing conditions of a receiving facsimile apparatus as a destination before transmitting the facsimile image to the destination. Therefore, when the multifunction peripheral 1 transmits, to the receiving facsimile apparatus as the destination, a document image read as a candidate for a facsimile transmission in the image reading section 110, the receiving facsimile apparatus can print the image as expected on the transmitting side.

For example, a general transmitting facsimile apparatus capable of acquiring information about a recording paper sheet from a receiving facsimile apparatus can acquire a recording paper sheet size and a printing magnification for use on the receiving side, which, however, are those specified by the transmitting side. Therefore, the transmitting side cannot specifically recognize how the facsimile image transmitted to the receiving side will be actually printed on the receiving side.

A technique is also known for allowing a printer to generate and display a preview image according to print setting before actual printing. Also in this technique, since the preview is displayed on the printer, the user having transmitted an image to the printer cannot check the preview unless he/she is close to the printer.

Furthermore, a technique is also known in which a transmitting facsimile apparatus specifies a printing manner of a receiving facsimile apparatus and allows the receiving facsimile apparatus to perform printing in the specified printing manner. However, since the transmitting facsimile apparatus specifies the printing manner for the receiving facsimile apparatus and allows the receiving facsimile apparatus to perform printing in the specified printing manner, if the receiving side is incompatible with the setting specified by the transmitting side and the transmitted image is manipulated in a compatible form on the receiving side, the transmitting side cannot recognize how the transmitted image will be actually printed.

Unlike the above conventional techniques, in the multifunction peripheral 1 according to the one embodiment of the present disclosure, the operator of the transmitting facsimile apparatus can recognize how the document image transmitted from the multifunction peripheral 1 will be actually printed on the receiving facsimile apparatus.

Figure 6:
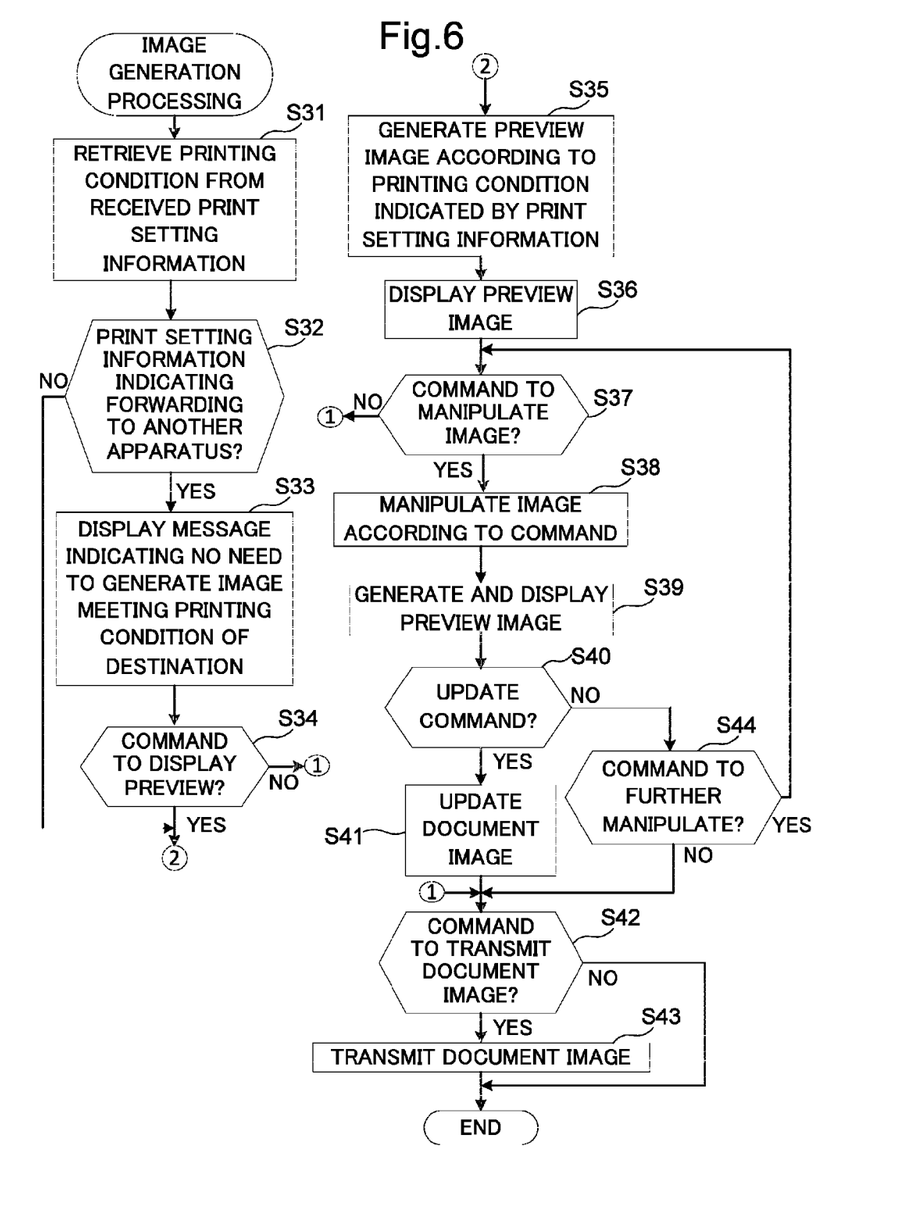
FIG. 6 is a flowchart showing a second embodiment of facsimile transmission processing which the multifunction peripheral performs as a transmitting facsimile apparatus based on the acquired print setting information.

Next, a description will be given of a second embodiment of facsimile transmission processing which the multifunction peripheral 1 performs as a transmitting facsimile apparatus based on the acquired print setting information. FIG. 6 is a flowchart showing the second embodiment of facsimile transmission processing which the multifunction peripheral performs as a transmitting facsimile apparatus based on the acquired print setting information. Further explanation of the same processing steps as those in the first embodiment will not be given.

In the second embodiment, when the preview image generating section 191 analyzes print setting information (S31) and retrieves, as a printing condition of a receiving facsimile apparatus as a destination, a setting of forwarding of a received facsimile image to an external apparatus, such as a personal computer or another facsimile apparatus (YES in S32), the control section 101 allows the display 150 to display a massage indicating that there is no need for the aforementioned manipulation processing for manipulating the facsimile image to meet the printing condition of the receiving facsimile apparatus as the destination (S33). Subsequently, the same processing steps as S12 and later steps in the first embodiment shown in FIG. 4 are executed (S35 to S44 in FIG. 6).

In the second embodiment, in the case where the receiving facsimile apparatus does not print a facsimile transmission image transmitted from the multifunction peripheral 1 but another apparatus having received the facsimile transmission image forwarded from the receiving facsimile apparatus prints it or simply displays it, the multifunction peripheral 1 can display the aforementioned message to notify the operator that it makes no sense to manipulate the image according to the printing condition of the receiving facsimile apparatus. Thus, the operator can avoid execution of useless operation and image processing.

Figure 7:
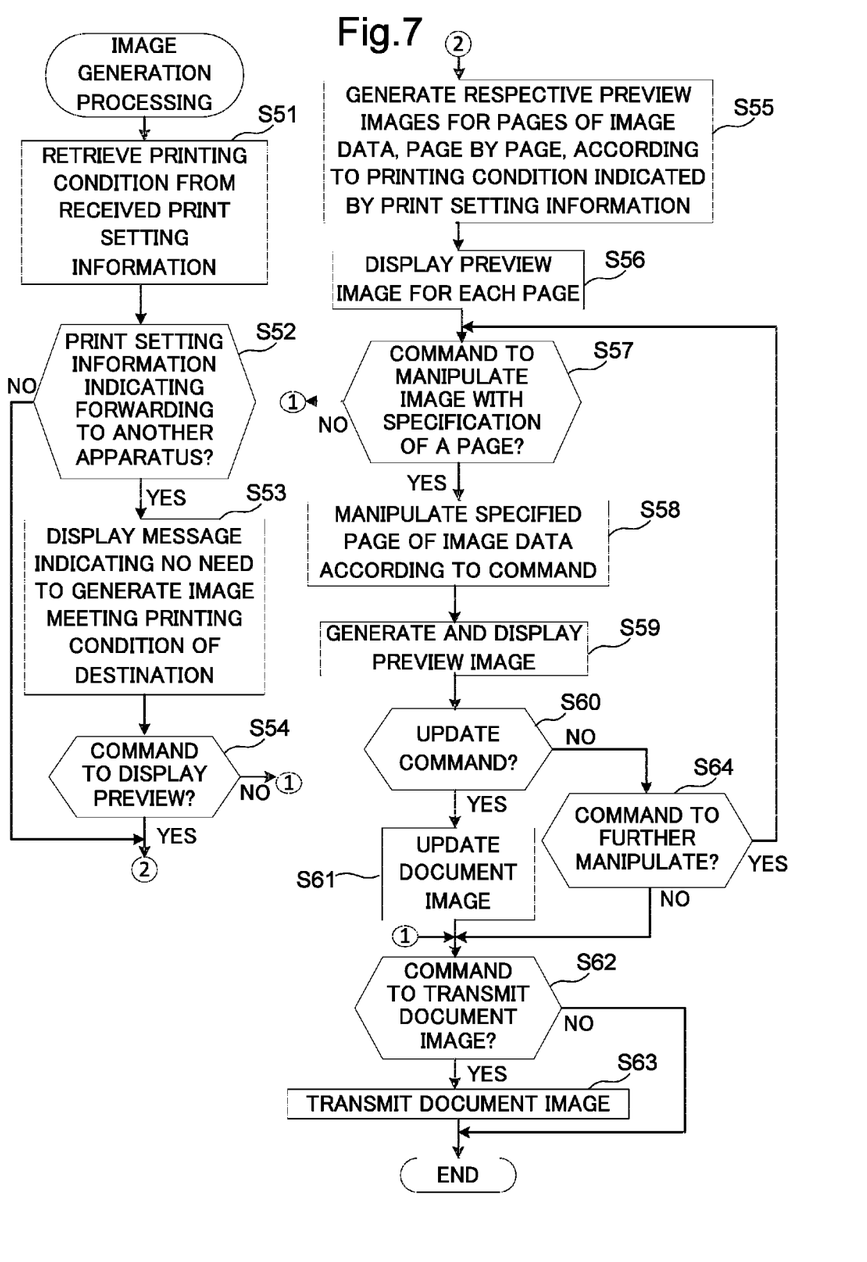
FIG. 7 is a flowchart showing a third embodiment of facsimile transmission processing which the multifunction peripheral performs as a transmitting facsimile apparatus based on the acquired print setting information.

Next, a description will be given of a third embodiment of facsimile transmission processing which the multifunction peripheral 1 performs as a transmitting facsimile apparatus based on the acquired print setting information. FIG. 7 is a flowchart showing the third embodiment of facsimile transmission processing which the multifunction peripheral performs as a transmitting facsimile apparatus based on the acquired print setting information. Further explanation of the same processing steps as those in the first and second embodiments will not be given.

In the third embodiment, when the operator enters a command to display a preview image (YES in S54), the preview image generating section 191 generates respective preview images for a set of pages of image data as facsimile transmission candidate images being subject to a facsimile transmission and stored in the image memory 120, page by page, according to the printing conditions indicated by print setting information received from a receiving facsimile apparatus as a destination (S55). The control section 101 allows the display 150 to display the generated preview images, page by page (S56).

Then, the manipulation command receiving section 192 receives the respective manipulation commands for the set of pages of candidate image data, page by page, based on an operator's operation of the operating section 47 (S57). In other words, the manipulation command receiving section 192 receives a manipulation command specifying which page of candidate image data to manipulate.

If the operator enters a manipulation command with a specification of a page (YES in S57), the preview image generating section 191 manipulates the preview image for the specified page of candidate image data according to the contents indicated by the manipulation command (S58). If the manipulated preview image for the specified page of candidate image data is displayed (S59) and the operator enters no update command (NO in S60) but enters a manipulation command again with a specification of another page (an additional manipulation command) (YES in S64), the processing goes back to S57.

The contents represented by a set of pages of image data as facsimile transmission candidate images may vary from page to page. For example, a certain page of candidate image data may contain an image only in the center of the image area of an A3-sized recording paper sheet. In this case, even when the image area is cut at each lateral side on a receiving facsimile apparatus as a destination, the image that the operator desires to be printed can be printed without missing any piece of image. On the other hand, another page may contain an image formed to both lateral ends of the image area of an A3-sized recording paper sheet. In this case, an image with missing pieces at both lateral sides will be printed on the receiving facsimile apparatus. Even in the above cases, in the third embodiment, the aforementioned manipulation can be performed of the set of pages of image data as facsimile transmission candidate images, page by page. Therefore, by subjecting the manipulation only to necessary pages, i.e., subjecting the manipulation only to pages from which images with missing pieces might be printed on the receiving facsimile apparatus and subjecting no manipulation to the other pages, the amount of operation for manipulation can be reduced.

Figure 8:
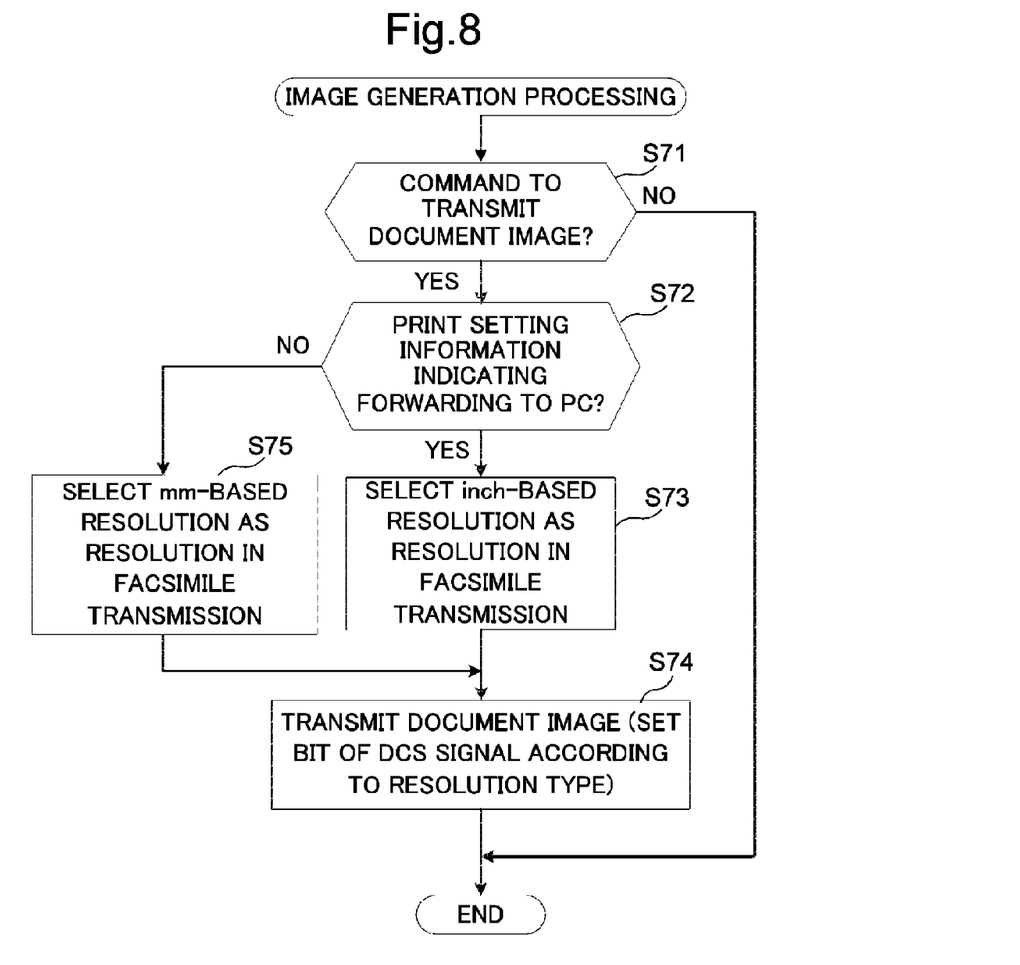
FIG. 8 is a flowchart showing another embodiment of a processing step of transmitting a facsimile transmission image in the facsimile transmission processing according to the first to third embodiments.

Next, a description will be given of another embodiment of the processing step of transmitting a facsimile transmission image in the facsimile transmission processing according to the first to third embodiments. FIG. 8 is a flowchart showing the other embodiment of the processing step of transmitting a facsimile transmission image in the facsimile transmission processing according to the first to third embodiments.

In the facsimile transmission processing according to the first to third embodiments, when a facsimile transmission image (an aforementioned manipulated or unmanipulated facsimile transmission image) is faxed to a receiving facsimile apparatus as a destination (S71, corresponding to S20 in FIG. 4, S43 in FIGS. 6, and S63 in FIG. 7), the control section 101 determines whether or not the printing conditions analyzed by the preview image generating section 191 contain the setting that the receiving facsimile apparatus forwards the facsimile transmission image to a personal computer (PC) (S72).

If the printing conditions of the receiving facsimile apparatus contain the setting of forwarding of the facsimile transmission image to a personal computer (YES in S72), the facsimile communication section 140 selects an inch-based resolution as the resolution for the facsimile transmission image subject to the facsimile transmission (S73).

On the other hand, if the printing conditions of the receiving facsimile apparatus contain a setting of forwarding of the facsimile transmission image to any apparatus other than personal computers, for example, another facsimile apparatus (NO in S72), the facsimile communication section 140 selects a millimetric-based resolution as the resolution for the facsimile transmission image subject to the facsimile transmission (S75).

After the selection of the resolution type according to the setting of forwarding, the facsimile communication section 140 transmits the updated facsimile transmission image to the destination (S74).

Figure 9:
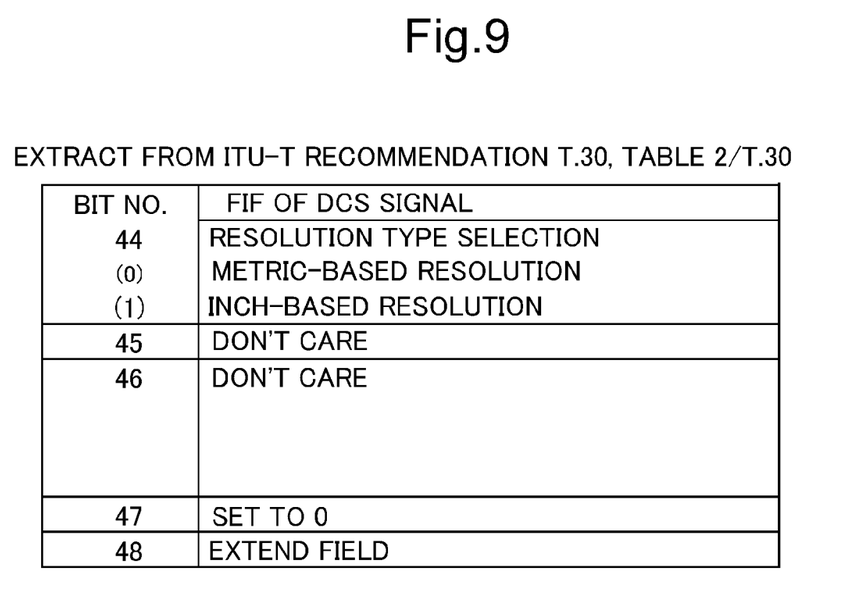
FIG. 9 is a table showing an example of definitions of the bits of a DCS signal based on ITU-T Recommendation T.30.

As shown as an example in FIG. 9, the facsimile communication section 140 defines the bits of DIS and DCS signals as below based on the ITU-T Recommendation T.30, so that the resolution of a facsimile transmission image to be transmitted can be selected from millimetric- and inch-based resolutions. Suppose that there are items predefined for bit numbers, for example, Bit No. 44 is defined as Resolution type selection, Bit Nos. 45 and 46 are defined as Don't care, Bit No. 47 is defined as Set to 0, and Bit No. 48 is defined as Extend field. In this case, if the field code of Bit No. 44 shown in FIG. 9 is set to 0 in transmitting a DCS signal, the facsimile communication section 140 can transmit the facsimile transmission image at a millimetric-based resolution. Alternatively, if the field code of Bit No. 44 is set to 1, the facsimile communication section 140 can transmit the facsimile transmission image at an inch-based resolution. In transmitting the facsimile transmission image to the receiving facsimile apparatus, the facsimile communication section 140 transmits it at a resolution according to the above DCS signal.

In the above manner, with the use of an inch-based resolution if the destination for forwarding from the receiving facsimile apparatus is a personal computer or a millimetric-based resolution if the destination is other than personal computers, a facsimile transmission image can be transmitted at a resolution for use in printing on the apparatus which actually will print, display or process the facsimile transmission image.

Figure 10:
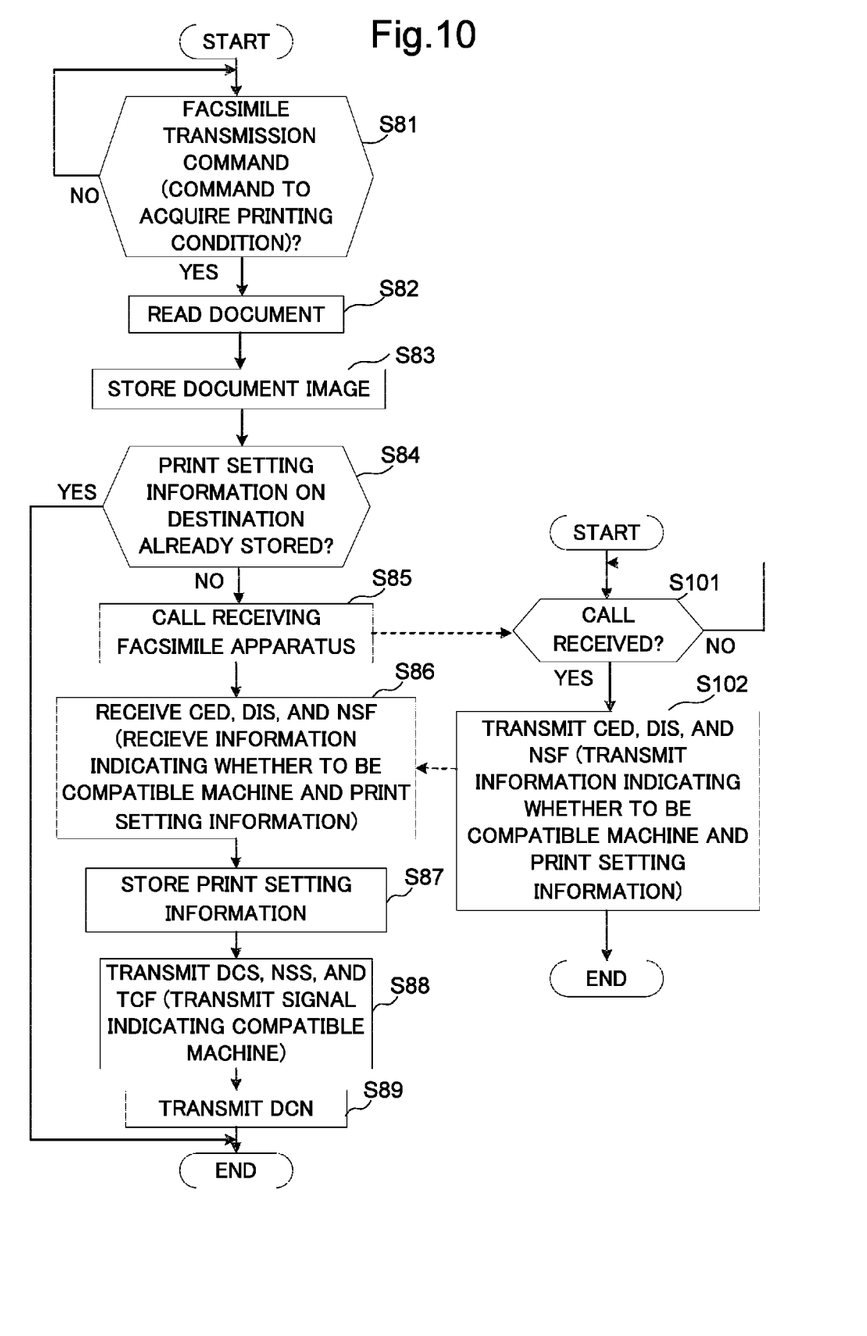
FIG. 10 is a flowchart showing another embodiment of facsimile communication processing when the multifunction peripheral acquires print setting information from a destination.

The present disclosure is not limited to the above embodiments and can be modified in various ways. For example, in the facsimile communication processing of the multifunction peripheral 1 shown in FIG. 3 for the purpose of acquiring print setting information from the destination, the control section 101 may determine whether or not a print setting of the destination entered by an operator's operation of the operating section 47 has already been stored in the print setting information management section 102 (S84).

In this case, if the control section 101 determines that a print setting of the destination has already been stored in the print setting information management section 102 (YES in S84), the facsimile communication with the destination for the purpose of acquiring print setting information is not performed.

On the other hand, if the control section 101 determines that no print setting of the destination entered by an operator's operation of the operating section 47 has yet been stored in the print setting information management section 102 (NO in S84), the facsimile communication with the destination for the purpose of acquiring print setting information is performed (S85 to S88).

Thus, useless operation can be eliminated for performing facsimile transmission processing for acquiring print setting information from the destination on which print setting information has already been acquired.

Furthermore, the configurations and processing shown in the above embodiments with reference to FIGS. 1 to 10 are merely illustrative of the present disclosure and not intended to limit the present disclosure to the above particular configurations and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A facsimile apparatus comprising:
   a data acquisition section configured to acquire data serving as a candidate for facsimile communication;
   a facsimile transmission candidate image storage section configured to store as a facsimile transmission candidate image the data acquired by the data acquisition section;
   a destination receiving section configured to receive from an operator a destination entry indicating a destination for transmitting the facsimile transmission candidate image;
   a facsimile communication section configured to transmit and receive, to and from a destination facsimile apparatus received as the destination, information necessary for facsimile communication including the facsimile transmission candidate image and print setting information indicating a printing condition of the destination facsimile apparatus;
   a print setting information management section configured to store the print setting information received from the destination by the facsimile communication section; and
   a facsimile transmission image generating section configured to manipulate the facsimile transmission candidate image to meet the printing condition indicated by the print setting information on the destination stored in the print setting information management section, thus generating a facsimile transmission image subject to a facsimile transmission to the destination;
   a display; and
   a control section configured to allow the display to display an image,
   the facsimile transmission image generating section comprising:
   a preview image generating section configured to generate a preview image by manipulating the facsimile transmission candidate image for the destination stored in the facsimile transmission candidate image storage section, using the printing condition indicated by the print setting information stored, together with an association with the destination, in the print setting information management section,
   a manipulation command receiving section configured to, when the control section allows the display to display the generated preview image, receive an entry of a manipulation command to manipulate the facsimile transmission candidate image from the operator; and
   an image manipulating section configured to manipulate the facsimile transmission candidate image according the received manipulation command to generate the facsimile transmission image meeting the printing condition, wherein
   the control section allows the display to display the generated preview image and the facsimile transmission image generated by the image manipulating section, and
   the image manipulating section is configured to superimpose a stamp indicating that the manipulation has been carried out when previewed on a header for the facsimile transmission candidate image subject to the manipulation.

2. The facsimile apparatus according to claim 1, wherein when the print setting information on the destination indicates a setting of forwarding of the facsimile transmission image from the destination facsimile apparatus to another computer, the control section allows the display to display a message indicating that there is no need to generate the facsimile transmission image meeting the printing condition indicated by the print setting information.

3. The facsimile apparatus according to claim 1, wherein the image manipulating section is configured to generate the respective facsimile transmission images for a set of pages of image data serving as the facsimile transmission candidate images, page by page, according to the respective manipulation commands received for the set of pages of image data, page by page, by the manipulation command receiving section.

4. The facsimile apparatus according to claim 1, wherein when the print setting information on the destination indicates a setting of forwarding of the facsimile transmission image to a computer connected to the destination facsimile apparatus, the facsimile communication section transmits the facsimile transmission image at an inch-based resolution.

5. The facsimile apparatus according to claim 1, further comprising a printer driver section, wherein the printer driver section is configured as the image manipulating section to perform at least part of the generation of the facsimile transmission image.

6. A facsimile communication system including a transmitting facsimile apparatus and a receiving facsimile apparatus both configured to perform facsimile communication, the transmitting facsimile apparatus comprising the facsimile apparatus according to claim 1, the receiving facsimile apparatus comprising:

a facsimile communication section configured to transmit and receive, from and to the transmitting facsimile apparatus, necessary information for the facsimile transmission; and a print setting information management section configured to store the print setting information indicating the printing condition, wherein the facsimile communication section of the receiving facsimile apparatus is further configured to, when receiving a request to transmit the print setting information from the transmitting facsimile apparatus, transmit the print setting information stored in the print setting information management section to the transmitting facsimile apparatus.

* * * * *